United States Patent [19] [11] Patent Number: 5,062,039
Brown et al. [45] Date of Patent: Oct. 29, 1991

[54] SHARING OF WORKSPACES IN INTERACTIVE PROCESSING USING WORKSPACE NAME TABLES FOR LINKING OF WORKSPACES

[75] Inventors: James A. Brown; Michael T. Wheatley, both of San Jose, Calif.

[73] Assignee: International Business Machines Corp., Armonk, N.Y.

[21] Appl. No.: 241,496

[22] Filed: Sep. 7, 1988

[51] Int. Cl.$^5$ .......................... G06F 15/16; G06F 3/00
[52] U.S. Cl. ..................................... 364/200; 364/230; 364/228.1; 364/230.3; 364/246.3; 364/246; 364/245.4; 364/255.7; 364/256.3; 364/256.4; 364/254.6; 364/955; 364/955.5; 364/966.4; 364/963; 364/963.3
[58] Field of Search ... 364/200 MS File, 900 MS File

[56] References Cited

U.S. PATENT DOCUMENTS

| 4,073,005 | 2/1987 | Parkin | 364/200 |
| 4,410,940 | 10/1983 | Carlson et al. | 364/200 |
| 4,553,202 | 11/1985 | Trufun | 364/200 |
| 4,736,321 | 4/1988 | Brown et al. | 364/300 |
| 4,787,035 | 11/1988 | Bourne | 364/300 |
| 4,809,168 | 2/1989 | Hennessy et al. | 364/200 |
| 4,849,877 | 7/1989 | Bishop et al. | 364/200 |
| 4,914,570 | 4/1990 | Peacock | 364/200 |

Primary Examiner—Thomas C. Lee
Assistant Examiner—Eric Coleman
Attorney, Agent, or Firm—Herb Somermeyer

[57] ABSTRACT

An APL environment includes the usual workspaces plus so-called packaged workspaces. The disclosed packaged workspaces are load modules created from saved workspaces. An active APL workspace can access a loaded copy of the packaged workspaces using external names of named objects in a packaged workspace rather than internal names of its own named objects. Program execution associated with the packaged workspaces is controlled through a copy of the packaged workspace name table stored in the active workspace accessing the read only packaged workspace. Access to packaged workspaces not only can be concatenated from other packaged workspaces, but also can be shared among a plurality of active workspaces.

7 Claims, 3 Drawing Sheets

20
'LIBRARY, XYZ' 11 □NA 'LMN"

```
            )CLEAR
         CLEAR WS
             3 11 □NA 'PACKAGE'
         1
             PACKAGE 'REPORT APLWSV2 A'
         REPORT TEXT A
```

| IDENTIFIER | | | |
|---|---|---|---|
| CREATION DATE | | | |
| OBJECT | R | ADDR | CLASS |
| · | · | · | · |
| · | · | · | · |

ALLOCATE FILE(SYSPUNCH) DSN(REPORT.OBJ) NEW +
   DSORG(PS) SPACE(5 5) TRACKS +
   RECFM(F B) LRECL(80) BLKSIZE (3120)                  22

```
            )CLEAR
         CLEAR WS
             3 11   NA 'PACKAGE'     23
         1
             PACKAGE 'REPORT'
         USER.REPORT.OBJ
```

FILDEF SYSLMOD DISK REPLIB LOADLIB A (RECFM U
LKED REPORT (NAME REPORT
FILEDEF SYSLMOD CLEAR                                   24
ERASE REPORT TEXT A

ALLOCATE FILE (REPLIB) DSN (PKGLIB.LOAD) NEW +
   DSORG (PO) SPACE(5,5) TRACKS +                       25
   BLKSIZE (4096) RECFM (U) DIR(2)

LINK REPORT LOAD (PKGLIB (REPORT)) RMODE (ANY)    26

'LIB.MEMB' 11 □NA 'ROUTINE'    46

'MODULE' 11 □NA 'ROUTINE'    47

*FIG. 2*

SHARING OF WORKSPACES IN INTERACTIVE PROCESSING USING WORKSPACE NAME TABLES FOR LINKING OF WORKSPACES

FIELD OF THE INVENTION

This invention relates to packaging diverse workspaces of an interactive processor including sharing accesses to each such workspace among a plurality of active users of the interactive processor.

BACKGROUND OF THE INVENTION

A widely used interactive language system is "A Programming Language", commonly referred to as APL. The APL processor typically executes in a data processing system having a keyboard input and a raster display output connected to a host processor. APL includes the facility to dynamically construct, modify and execute software as well as directly process data. This processing power derives from its general data structure, the array coupling and the ability to define powerful operators on the structures. There are several descriptions of APL and known APL program products: see Gilman and Rose, "APL: An Interactive Approach", 3rd Edition, John Wiley Publishing Co., 1984; Polivka and Pakin, "APL: The Language and Its Usage", Prentice Hall Publishing Co., 1975; Rodney Zaks, "A Microprogrammed APL Implementation", Sybex, Inc., 1978; Brown, Pakin and Polivka, "APL2 at a Glance", Prentice Hall, 1988 and the IBM publication SH209227, entitled "APL2 Programming: Language Reference, available from International Business Machines Corporation (IBM).

The APL interactive environment supports the definition of software and data upon which the software operates. The APL constructs for software and data are grouped together into accessible "workspaces". While in use for the processing of said software and data, a workspace is maintained in the host processor's internal data storage (main memory). For storage between APL sessions, such workspaces (hereafter WS's) are copied or "saved" from the host processor internal data storage to external retentive data storage. APL commands, issued from within the APL interactive environment, enable the WS's to be saved and retrieved. APL computations are an interpretive program execution.

Each WS is a collection of APL data structures which include named APL objects (variables, defined functions and defined operators), a name or symbol table which enables access to the named objects within the WS (each WS has its own name table and internal addressability constructs), an execution stack which indicates the current state of execution, both current and pendant, and diverse other objects, such as temporary results and control blocks used by the APL interpreter in its execution of APL applications. Several APL users may be active on one system at the same time and each user is independent of each and every other user. Each APL user has one WS, termed the active WS, which resides in the host processor internal data storage. All WS's not currently active reside in external data storage are referred to as "saved" WS's. To access objects of a saved WS; either the saved WS is first loaded into the host processor internal data storage replacing the current active WS or the desired named objects are copied from the saved WS into the current active WS. When a workspace is loaded, it becomes the active workspace, replacing the prior active workspace in processor internal storage. It is desired to increase the operational flexibility of APL WS's while more efficiently using the host processor internal data storage and reducing the number of users inter-actions required to manage WS's and their contents.

The size and complexity of APL usage has grown to such an extent that managing named objects in a WS has become an increasing problem. An example of the problem is an APL application involving thousands of APL functions and variables, all named. In a WS, the name of each function and variable has to be kept unique at any given instant. Dynamically changing a WS can be difficult because of inadvertent object naming errors. While the naming problem could be solved by segmenting the APL application into a plurality of linked WS's with each WS relating to a particular operation of the application, many APL applications are so dynamic such that no predictable pattern of application solutions can be made. If a large plurality of relatively small WS's are used, then the time for loading the WS's and saving same to external data storage becomes computationally inefficient and time consuming. It is desired to provide a simple but effective management procedure and apparatus for managing names of objects used in application programs.

In APL, each user programmer has its own copy of the application code in the active WS. As the number of simultaneous users increases, the need for additional host processor internal data storage (main memory) also increases. This increase in internal data storage usage can also result in degraded host processor operation caused by storage contention and host processor "thrashing" due to excessive paging WS's between internal and external data storage. In combination with improved management of object names, it is desired to enhance utilization of internal host processor data storage.

DISCUSSION OF THE PRIOR ART

Brown et al in U.S. Pat. No. 4,736,321 shows a method for accessing and actuating external processes from within an interactive environment. This teaching does not show the management and controls for effecting operation and control of plural cooperating workspaces when all workspaces are resident in internal data storage of a host processor, i.e. wherein the active workspace is not saved to external data storage.

Carlson et al in U.S. Pat. No. 4,410,940 show a method of transferring control between hierarchically related cooperating sequential processes executable in a multi-processing environment. Pointers identify active and suspended processes. Activation records are generated and stored, then the process pointers are updated to record the suspension of one process and activation of another process by resuming program execution in the most recently executing portions of the another process. Each process has one activation record in internal data storage. The record points to the activation that is the parent of the process, to the most recently executing portion of the process and defines the current execution state of the process. No suggestion is made regarding parallel executing processes which exhibit independence while sharing data structures.

Trufyn in U.S. Pat. No. 4,553,202 teaches how a user actuates a real time resource reallocation in a multi-tasking environment. The operating system builds a queue against such resources and wherein a new task is interrupt invoked. Then a dispatcher allocates the resource to the next task in the resource queue with the queue switching being orthogonal to the process scheduling by the dispatcher.

SUMMARY OF THE INVENTION

It is an object of the invention to provide greater flexibility in interpretive computing while reducing memory requirements and external access requirements of a host processor than heretofore provided.

It is another object of the invention to facilitate central maintenance of utility and other shared functions in an interactive data processing environment and enabling limits to be imposed on entry points to applications.

In accordance with the invention, workspaces (WS's) are "packaged" or "encapsulated" and permitted to reside in the host processor internal data storage along with active WS's of a plurality of independent users. Each packaged WS is preferably read only. The name tables of the various WS's (active, saved, packaged) include internal and external names. The APL interpreter upon reading an external name in a name table for either an active or a packaged WS, accesses a packaged WS which has an entry point identified by an external name matching the name encountered in the name table. Program execution then proceeds in the newly accessed packaged WS until reference is made back to the active WS. When a packaged WS is first accessed from the active WS, a private copy of the name table of the packaged WS is copied to and retained in the active WS. The private copy in the active WS is used for all of the computations conducted in the packaged WS on the behalf of the active WS. Names and status information about the packaged WS as accessed and used by the active WS are also retained in the active WS. All processing in the packaged WS's is controlled from the accessing active WS copy of the respective copies in the active WS of the name tables of such packaged WS's. The active WS when saved to external data storage, may contain private copies of name tables and modified objects from the previously accessed packaged WS's, as well as names and status information for those packaged WS's. This information is preserved with the active WS on external data storage when the active WS is saved. This information is retained when a saved WS is retrieved or copied from external data storage.

Packaged WS's can be accessed effectively simultaneously by a plurality of active WS's, either directly or through other packaged WS's. The private copy of items from each accessed packaged WS's is modified and retained in the active WS causing the accessing. Such packaged WS accessing can be concatenated to any degree, the only limit is memory storage capacity. A library of the packaged WS's may be loaded preparatory to program execution or may be loaded upon a determined need.

The foregoing and other objects, features, and advantages of the invention will be apparent from the following more particular description of preferred embodiments of the invention, as illustrated in the accompanying drawing.

BRIEF DESCRIPTION OF THE DRAWING

FIG. 2 illustrates a name table construction and some control statements useful in connection with the FIG. 1 illustrated application.

DETAILED DESCRIPTION

Figure 1:
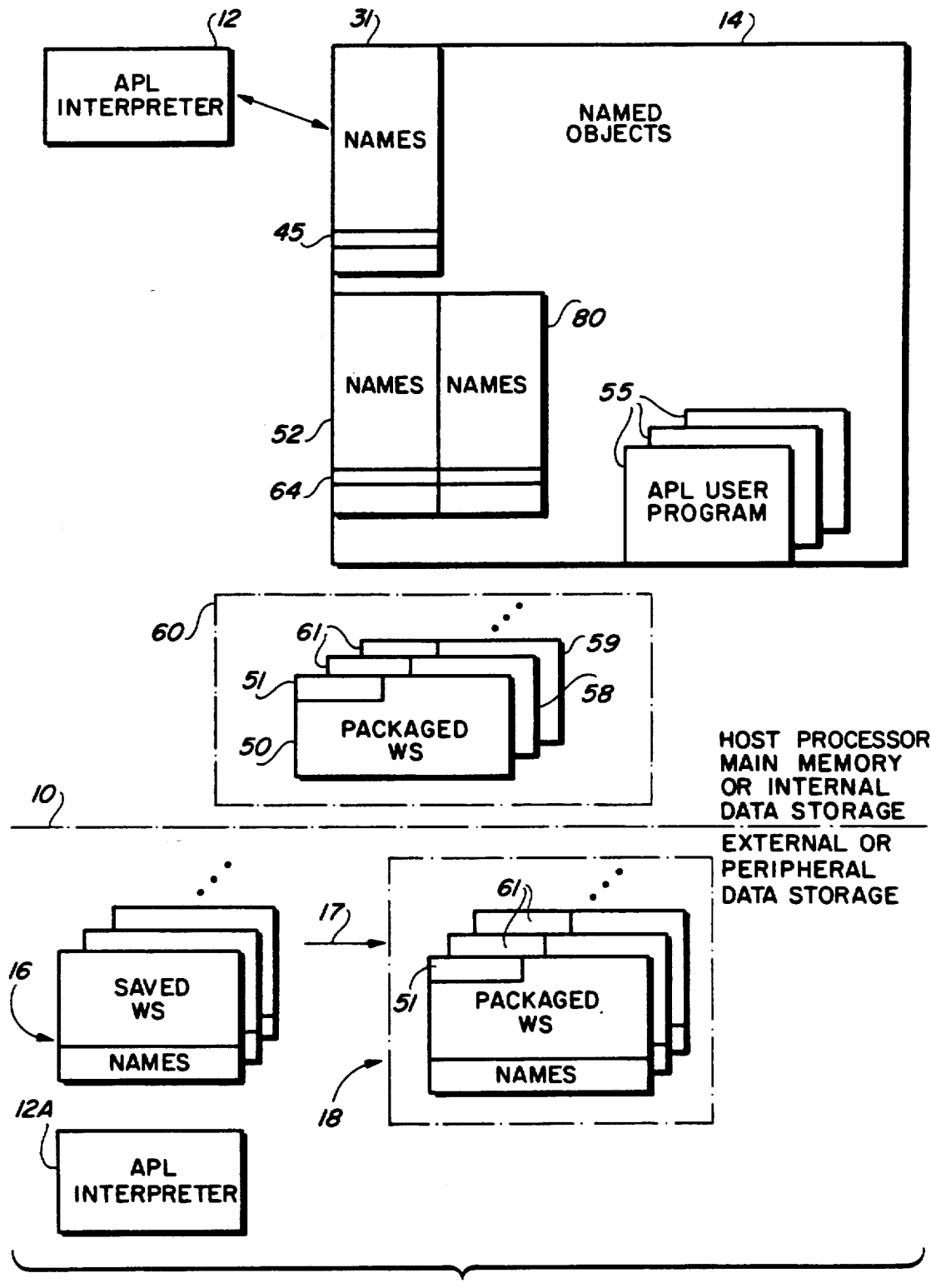
FIG. 1 illustrates data structures used in implementing the present invention and the interactions of such data structures in host processor and external data storage areas.

Referring now more particularly to the appended drawing, like numerals indicate like parts and structural features in the various figures. The portion of FIG. 1 above dashed line 10 are those data structures stored in a host processor internal data storage (main memory, the host processor and its internal data storage are represented by the drawing space above the dashed line 10—the details of a host processor and its internal data storage are so well known that description thereof is dispensed with). The portion of FIG. 1 below dashed line 10 represents the peripheral or external data storage (such as magnetic disks and tapes) which store the saved WS, programs and the like, as is well known. Preparatory to APL applications being executed, the stored copy 12A of the APL interpreter is loaded into internal data storage as interpreter 12. The usual APL programs 55 are interpreted and executed by APL interpreter 12. Also, the usual keyboard inputs and raster displays (screens, printers, and plotters) are omitted for simplicity. The drawing contemplates a single APL user having a set of user programs 55 in active WS 14. Such active WS was previously loaded into internal data storage from the collection of saved WS's 16 in external data storage. The description to this point describes a typical APL executing situation wherein an APL interpreter 12 in internal data storage services a plurality of independent users, each user having an active WS (not shown). The APL interpreter may be the APL2 program product sold by IBM, Armonk, N.Y.

In accordance with the invention, some WS's are packaged and converted to read only load modules which constitute the packaged WS's, no limitation is intended to packaged WS's being read only load modules. Such packaged WS's are usable by either a single user (via a single active WS) or for sharing among a plurality of users. Any saved WS of set 16 may be converted to a packaged WS, as indicated by arrow 17, by first converting the saved WS into a so-called object module format. Such object module format is the same format used as the output from known compilers as COBOL, FORTRAN, PL1, etc. The WS in the object module format is then link edited into a load module. The link editing is a typical link editing operation by a known system link editor. The link edited WS (now a load module) is a packaged WS stored in a library 18 of external data storage. In other words, a packaged WS is a saved WS which has been reformatted into a load module for loading into internal data storage by other means than an APL ")LOAD" command. Packaged WS's are copied from external storage into internal storage by the APL interpreter 12, as required, using the usual host processor facilities for copying load modules from external data storage into the processor. APL statement 20 (FIG. 2) can be used for retrieving a packaged WS. Statement 20, which can be imbedded in an APL user program 55, identifies library 18 (LIBRARY), a particular packaged WS (XYZ) in the library and the name of the object (LMN) to be accessed in the packaged WS. The remainder of statement 20 includes syntax and semantics consistent with known APL expressions.

Two of the three above-described machine-executed steps for creating a packaged WS are next detailed for the IBM VM/CMS and IBM MVS/TSO operating system environments. Both operating system environments are sold by International Business Machines Corporation, Armonk, N.Y. The description assumes that the WS to be packaged has been created and is currently saved, preferably as a duplicate copy of an original WS, in external data storage. APL process 21 (FIG. 2) creates the object or text module in the VM/CMS environment while APL process 22, 23 creates the object module in the MVS/TSO environment. The external function 'package' in processes 21 and 23 have the saved WS to be packaged identified as the argument to the right of the command 'package' and the object or text file is identified directly under the external command, at numeral 21A, using the respective file naming conventions of the operating systems. The package functions convert the saved WS to a format of an object or text module without modifying the contents in any way. TSO process 22 allocates space in the MVS operating system environment before the package function can be executed.

Once the object module is created in either environment, the load module to be stored in library 18 is created. In the VM/CMS environment, the CMS commands 24 create the load module for the WS specified in process 21. Such CMS commands can be invoked from within APL by either a ")HOST" command or by AP 100. The first CMS command names the load library 18 into which the load module (packaged WS) is to be externally stored. The second CMS command effects the conversion of the text or object module created by process 21 to be converted into load module format to be stored in the named load library. Such CMS commands are known. In the MVS/TSO environment, TSO commands create the load module constituting the packaged WS. The TSO "ALLOCATE" command 25 creates a load library, such as library 18. Once library space is allocated, then the TSO "LINK" command 26 is executed creating the load module constituting the packaged WS. Once the load modules are created, the object module versions of the packaged WS are preferably deleted while the original saved WS is preferably retained for implementing any changes or corrections to be made in a packaged WS.

Accessing named objects within an APL packaged WS is next described. Each WS, including each packaged WS, has a name or symbol table 30 (FIG. 2). In the active WS 14 name table 31 constructed in a known manner and diagrammatically shown as table 30 has a plurality of address pointers in name table entries pointing to the named objects within the WS. This arrangement allows complete independence in naming internal objects among the various APL users and their respective WS's. Such internally pointing names are herein termed "internal" names. The contents and arrangement of table 30 in an active WS changes as the APL program execution proceeds. For each named object in the active WS, there is a named object entry 35 in name table 30. That named object entry 35 includes the name 36 of the object, or a pointer to the name, whether the named object has been resolved (indicated by R 37 of FIG. 2), a pointer (ADDR 38 of FIG. 2) which enables access to the named object, and a classification field CLASS 39 of the named object into one of a set of classes of APL objects, such as function, variable, system function, etc.

The present invention extends the usage of APL "external" n for objects external to the active WS to include packaged WS's currently residing in internal data storage or stored only in external data storage. Such external names are distinguished from internal names in the CLASS field 39; the CLASS field 39 designates the object name as being internal or external in addition to indicating the type of object. The external object indicates a named object external to the WS. An external object may refer to a non-APL program, as described in U.S. Pat. No. 4,736,321 or it may refer to an APL object in a packaged WS.

Figure 3:
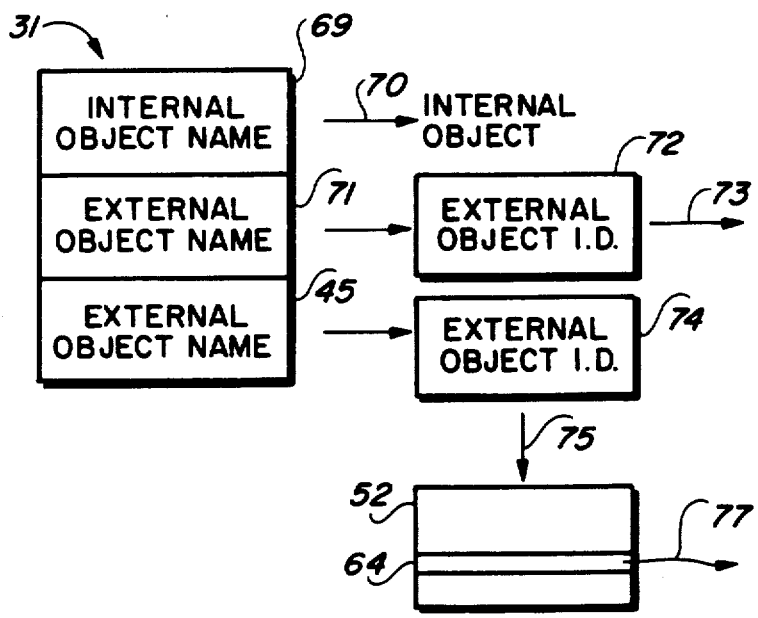
FIG. 3 is a simplified showing of a logical connection between an active WS and a packaged WS.

FIG. 3 shows control data structures used to access external objects in a constructed embodiment. Only one example of two different external accesses are shown. Name table 30 (FIG. 2) in CLASS field 39 identifies the type of name, including names for functions, variables, internal or external objects, etc. In name table entry 69 of name table 30, an internal object name is found which points, as indicated by arrow 70, to an object within WS 14. In the case of the private copy of a name table of a packaged WS, the internal name points to an object within the corresponding packaged WS. Name table entry 71 points to an external object, as known in the prior art. Entry 71 address portion ADDR 38 points to control block 72 which identifies the external object and how to access the external object, as indicated by arrow 73. The external linkage for practicing the invention in the constructed embodiment is exemplified by name table entry 45 which has an external name and an address pointer to control block 74 which in turn identifies and points to a private copy of a name table, such as copy 52, all as indicated by arrow 75. Name table entry 64 of name table 52 then points to the object within the packaged WS 50, as indicated by arrow 77. It is to be understood than many of such structures are found in name tables of the active WS's and of the packaged WS's which enables efficient concatenating accesses to plural packaged WS's. Control block 74 was previously created by APL interpreter.

As interpreter 12 is executing in active WS 14, it may encounter an external name 45 in name table 31. This external name 45 directs APL interpreter 12, as shown in FIG. 3, to one of the packaged WS's either currently residing in internal data storage or in library 18. APL interpreter 12 retrieves packaged WS's from library 18 using the usual processor input-output facilities. FIG. 2 illustrates two APL statements 46 and 47 than may be used to access a packaged WS stored in library 18. In statement 46, 'ROUTINE' specifies the name of the named object in a load module named MEMB which resides in library LIB (the ddname of MVS/TSO or the file name in VM/CMS, the file name has to have a file type of LOADLIB) constituting the packaged WS. Similarly, statement 47 identifies named object ROUTINE of packaged WS MODULE. In MVS/TSO, the named load module is found using the usual search order for such requests. In VM/CMS, the CMS nucleus extension named MODULE is used when it exists. If the extension does not exist, then the object module (if not erased after creating the corresponding packaged WS) will be loaded. Statement 46 is preferably used when the packaged WS is to be loaded into internal data storage from a load library in external data storage.

Statement 47 is preferred when the packaged WS is to be used on a resident shared basis by a plurality of users. In using statement 47, full cognizance of the environmental effects on searching could produce unintended loading results, i.e. the specific characteristics and requirements of the environments have to be fully considered.

Once a copy of the packaged WS is loaded from library 18 into the internal data storage, that copy can remain in internal data storage for the duration of the APL session (as long as the user is being active via the user's active WS, of course, subject to the operating system allocation controls of its internal data storage). For example, copy 50 of a packaged WS is shown stored in the internal data storage for use in connection with active WS 14. As soon as copy 50 appears in internal data storage, interpreter 12 accesses the named object of entry 45. Included in the initial accessing machine-executed is copying the name table 51 from copy 50 of the packaged WS into the active WS 14 as name table 52 and can create control block 74 at this time. Remember that each packaged WS may be a read only data structure; therefore, the copy of name table 51 in the packaged WS cannot be dynamically used, as desired. The name table copy 52 in the active WS becomes a "private copy" of the name table 51 which is dynamically changed by an executing one of the APL programs 55 executing via interpreter 12 in the active WS 14. Even when a packaged WS is not read only, it may be desired when such packaged WS is shared, that a private copy of the name table still be made in the active WS. Of course, the usual serialization techniques for shared resources must be used in connection with writable packaged WS's; also, write protect or lock out controls can be employed as well for writable packaged WS's.

The private copy 52 of name table 51, as changed by program execution, remains with WS 31 when it is saved to external data storage. Once name table copy 52 is in WS 14, interpreter 12 accesses the copy 52 as an additional name table. To this end, as seen in table 30 (FIG. 2) identifier field 56 identifies the respective name table. The internal data storage copy 50 of the packaged WS is accessed by interpreter 12 and executes from the read only copy 50 using the name table copy 52 in the current active WS.

A plurality of packaged WS's 50, 58, 59 etc may be simultaneously maintained within internal data storage along with active WS 14. It is preferred that the packaged WS's be stored in a so-called common system area 60, such as the link pack area of MVS (IBM program product Multiple Virtual System) or a discontinuous shared segment of CMS (another IBM program product). When the packaged WS is in a common system area, it is accessible by a plurality of users, i.e. is effectively simultaneously operable with a plurality of active WS's. As shown in the drawing, packaged WS's 50, 58 and 59 have been loaded into common system area 60 of internal data storage.

Each of the packaged WS's have name tables 51, 61 containing internal and external names; when the packaged WS is generated, a limited set of names may be declared as being the only entry points for that packaged WS. In this instance, external name 45 of name table 31 must match or be matchable with the entry point name 64 of name table copy 52 from packaged WS 50 whenever the user program 55 using active WS 14 is to access packaged WS 50. This limitation of entry may be dispensed with to enable accessing any of the named objects of the packaged WS, such as all internal named objects in name tables 61.

In executing a user program 55, APL interpreter 12 upon reaching external name 45 in name table 31 finds the name unresolved as indicated by R 37 (FIG. 2). It then dynamically creates and executes an APL expression, such as APL expressions 46 or 47, from the information in control block 74 which points to private name table copy 52 (arrow 75). Name entry 64 in name table copy 52 identifies packaged WS 50 as indicated by arrow 77. Packaged WS 50 is now accessed by APL interpreter 12 for executing programs, accessing objects, etc while using the private name table copy 52 in the active WS. At this time, rather than saving active WS 14 to external data storage, as in the prior art, active WS 14 remains in internal data storage ready for the returning access of APL interpreter 12. APL interpreter 12 continues interpretative program execution of an APL program 55 within packaged WS 50 using the same procedures as used in the prior art excepting that the name table copy in the packaged WS is not used and the results are stored in active WS 14. This execution from within the packaged WS does not make WS 50 the active WS; rather WS 14 remains the active WS. When the APL operations within WS 50 complete, then APL interpreter 12 returns to active WS 14 to continue execution of user program 55.

Each packaged WS has entry designated names which are addressable from outside the load module; such addressability is achieved as shown in FIG. 3. Additionally, some of the external names of a packaged WS may be used for accessing other packaged WS's. In packaged WS 50, external name 64 can be a temporary exit external name for packaged WS 50. APL interpreter 12 upon accessing external name 64 during processing in packaged WS 50, generates a known APL system function having a left argument identifying a WS to be accessed and a right argument identifying a named object within the WS to be accessed. Such WS to be accessed can be active WS 14 or any packaged WS. Other packaged WS's can be used in the same manner. For example, packaged WS 58 can be accessed using the above described procedures. Upon initial access to packaged WS 58 by packaged WS 50, its name table 61 is copied into active WS 14 as name table copy 80. Accesses by the APL program from active WS 14 to packaged WS 58 is via name table copy 80. Program execution within packaged WS 58 is accessed via packaged WS 50 is the same as if the secondarily accessed packaged WS were accessed directly from an active WS 14. This concatenation of accessing packaged WS's from a single active WS is unlimited in logic; a practical limitation occurs based upon the data storage capacity of internal data storage of the executing host processor.

Remember the active/saved WS's and the packaged WS are programmed using the APL language. There is one private name table copy in an active or saved WS for each packaged WS that was accessed by any active WS, whether directly or via any other packaged WS. Then while executing out of a packaged WS, APL interpreter 12 stores in the corresponding active WS a copy of all modified objects and changes in the name table, such as marking the external names "resolved" or "unresolved" in APL nomenclature.

The active WS stack is used for tracking all APL operations based on packaged WS's.

Upon the initial copying of a name table from a packaged WS to an active WS, all names in the name table, whether internal or external, are marked "unresolved". Only when the names in the private name table copy in an active WS are necessary for continuing APL execution in the source packaged WS does APL interpreter 12 goes through the process of resolving those names so that such names point to (indicate addresses) actual named objects in the packaged WS. Whenever an active WS is saved to external data storage, all of the name tables copies are also saved as a part of the saved active WS.

It is also desired to conserve usage of internal data storage. As packaged WS's come into disuse, such WS's can be erased from internal data storage. A simple technique of tracking usage is to treat each access via an active WS as an "open" of the load module and completion of APL interpreter 12 processing in any packaged WS as a "close" of the load module. The opens are counted and the closes are subtracted with the open count. When the count is zero, the packaged WS can be made eligible for erasure. This open and close technique is widely used with respect to processing files of all types. Some important or widely used packaged WS's can be bound to internal data storage (not eligible for erasure) so long as APL interpreter 12 is resident in internal data storage. Other space management techniques may be employed as well.

From all of the above, it is seen that the concepts and operations including packaged and private WS's enhances the flexibility and power of the interpretive language. It also conserves memory space in that any packaged WS can be shared among a plurality of active WS's (each associated with and controlled by an independent user). The private copies of name tables of packaged WS's maintain a record of the modifications of the packaged WS enabling recursive and independent processing while using a read only packaged WS.

Figure 4:
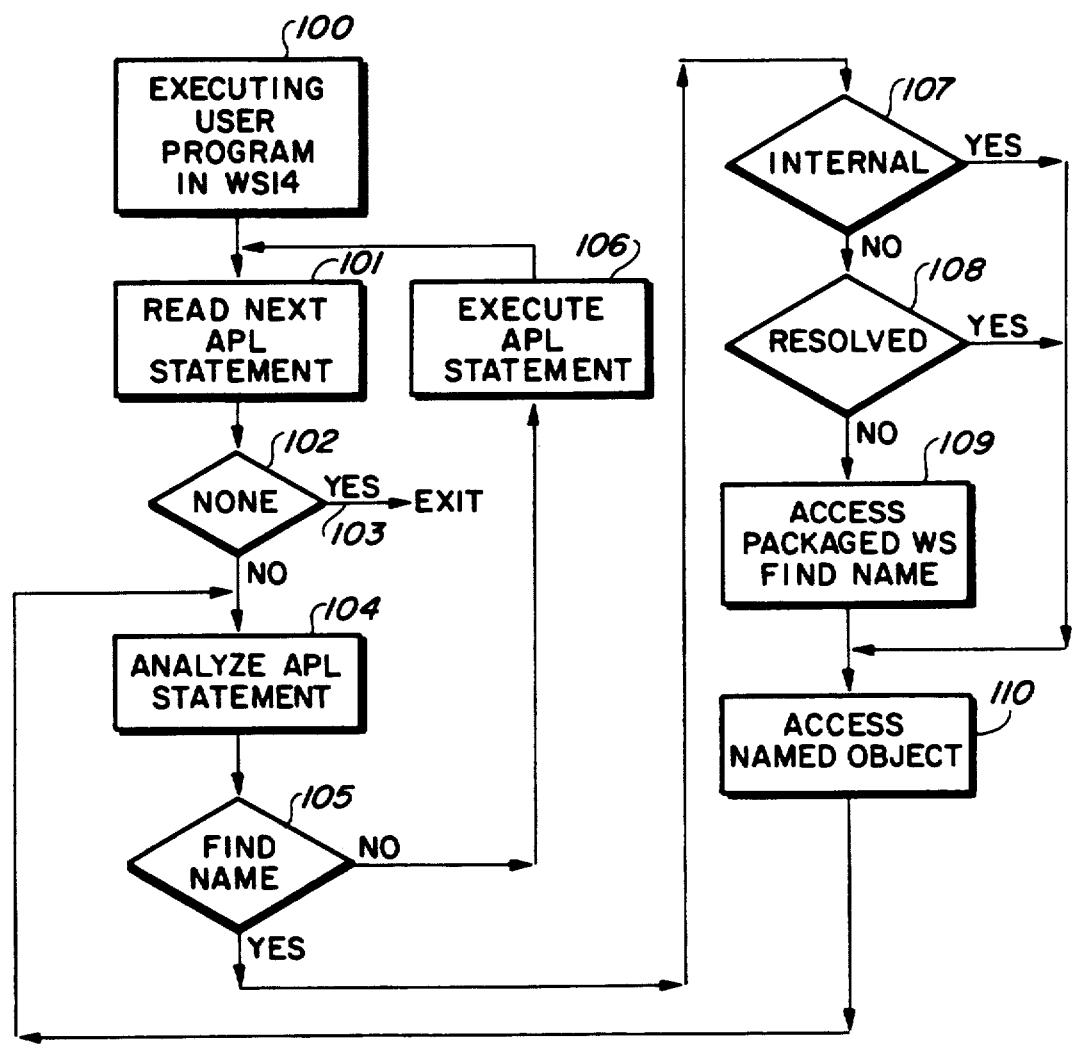
FIG. 4 is a simplified machine operations chart illustrating the machine operations relating to the FIGS. 1 and 2 illustrated data structures for illustrating incorporation of the invention into an APL environment.

FIG. 4 is a simplified machine operations chart illustrating incorporation of the present invention into an APL environment. The chart assumes that APL is executing a user program as at step machine executed step 100. The next APL statement in a program 55 is read at machine executed step 101. If there are no more statements, then at machine executed step 102 the user program is exited, as at arrow 103. Otherwise, at machine executed step 104 the just read statement is analyzed, as is known. If no object names are included in the analyzed statement, then the statement is executed in machine executed step 106; upon completion of step 106, control is returned to read the next APL statement in machine executed step 101. If during analysis of the APL statement in machine executed step 101, an object name is encountered, the current name table is accessed in machine executed steps 107 and 108 to determine the characteristics of the named object. If the object is found to be internal, it is accessed as known for machine executed step 110; control is then returned to analysis step 104. If the object is found to be external, a check is made in machine executed step 109 to determine if the name has been resolved; if the name is not resolved, the packaged WS is determined in machine executed step 109 from control block 72, 74. The packaged WS is loaded into internal data storage if necessary with a generated statement 46, 47; then the object is located in the packaged WS. The private copy of the packaged WS name table 52 is updated to reflect resolution of the object in the packaged WS. Finally, the object is accessed, as is known, in machine executed step 110 and control is returned to statement analysis of machine executed step 104. The FIG. 4 machine operations chart is intended only to be representative; in a practical embodiment the machine operations become much more complex than what is shown.

When a named object accessed in machine executed step 110 is found to be a user program in a packaged WS, the state of the executing APL program 55 is saved in the APL execution stack (not shown), as is known. The identifier 56 of its name table 31 is also saved in the APL execution stack; the current name table 31 is switched to the private copy of the packaged WS name table 52. Then the named user program is executed, as is known. While that user program is executing (such as described with respect to FIG. 4), the private copy of its packaged WS name table 52 is used to find named objects in the packaged WS. When the user program execution has completed, as represented by arrow 103, the state of the previously executing program is restored from the execution stack in the usual manner and its associated name table 31 is restored as the current name table.

Packaged WS's can be changed or updated after their creation. Such changes may unintentionally result in unexpected results when invoked by an active WS which previously accessed an earlier version of the packaged WS. To ensure correctness in program execution, each name table of a packaged WS has a creation date entry 98 (FIG. 2). Then, during program execution which accesses a packaged WS, the creation date of the accessed packaged WS can be compared with the creation date entry in the private name table copy in the active WS; a discrepancy can result in a user message or an error condition can be defined.

From all of the above it is seen that packaged WS's can segment APL applications in an arbitrary or methodical manner and appear substantially as if one active WS is in effect for a user. APL applications are made more modular; that is, tested large functions can be embedded into a packaged WS and then used by one or more users on a read only basis. Packaged WS's also provide name isolation for reducing the potential name contention in a growing or changing APL applications. Efficiency is increased in that name verification procedures are simplified and shortened. Packaged WS's also provide for dynamically changing application programs with a minimal effort and maximal accuracy, including in shared applications. By using private load modules as packaged WS's, the readability of a WS is reduced, a security and protection attribute. Finally, packaged WS's in effect give access to a plurality of WS's for one user in one session. When an external function is called from a user's active workspace, the system can switch from the name table (also referred to as name scope) of the active WS to that of a packaged WS. Until completion of the packaged WS operations, all names in the active WS remain resolved while the external function is being performed.

While the invention has been particularly shown and described with reference to preferred embodiments thereof, it will be understood by those skilled in the art that various changes in form and details may be made therein without departing from the spirit and scope of the invention.

What is claimed is:

1. In a machine-effected method of effecting multi-processing in a digital computer having internal data storage and wherein each process being executed in the multi-processing is independent and operates within an addressable workspace resident in said internal data storage which when active for such process is an active workspace and is exclusively accessible by such process, each workspace including named objects and a name table for internally establishing addressability of the workspace contained named objects, the improvement including the machine-executed steps of:

converting predetermined ones of said workspaces, including the respective name tables, into load modules, each of said load modules constituting a packaged WS;

designating names in the name tables of said predetermined ones of the workspaces as entry points for such workspaces, respectively, of said packaged WS's;

adding external names to the name tables of other than said predetermined ones of said workspaces, respectively;

denominating predetermined ones of said names respectively entry and exit points for linking second predetermined ones of workspaces having said designated names and added external names;

when a process is executing in said active workspace encounters an external name in said name table and which is an exit point of such active workspace, exiting the active workspace and continue executing in a one of said packaged WS's having an entry name which is identical to said encountered external name;

when beginning process execution in any predetermined one of said packaged WS's for the first time, copying the name table of the packaged WS into said active workspace and when executing with respect to the packaged WS, accessing objects in the packaged WS from the copy in the predetermined one of said active workspaces rather than the name table of the predetermined one of said packaged WS's;

in a first given one of said packaged WS's, inserting an external name in a name table of said first given one packaged WS which directs program execution in said first given one packaged WS to a second given one of said packaged WS's and inserting an entry one of said designated names in said second given one packaged WS which is identical to said inserted external name of said first given one packaged WS;

linking a sequence of packaged WS's to said active workspace resident in said digital computer;

sequentially accessing a one of said packaged WS's from said packaged WS's in said sequence of packaged WS's; and copying the name tables of the said sequence of packaged WS to said active workspace for creating private name table copies of each of said name tables copied from the sequence of packaged WS's in said active workspace and storing a copy of the name table of said one packaged WS in each of said workspaces in said sequence of workspaces.

2. In the machine-effected method set forth in claim 1, further including the machine-executed steps of:

identifying a one of said packaged WS's to be a future read only packaged WS; and inserting into said future read only packaged WS external names that are identical to predetermined designated names in a plurality of said packaged WS's and which have been denominated as entry points and then making the future read only packaged WS a read-only WS.

3. In a machine-effected method of effecting multi-processing in a digital computer having internal data storage and wherein each process being executed in the multi-processing is independent and operates within an addressable workspace resident in said internal data storage which when active for such process is an active workspace and is exclusively accessible by such process, each workspace including named objects and a name table for internally establishing addressability of the workspace contained named objects, the improvement including the machine-executed steps of:

converting predetermined ones of said workspaces, including the respective name tables, into load modules, each of said load modules constituting a packaged WS;

designating names in the name tables of said predetermined ones of the workspaces as entry points for such workspaces, respectively, of said packaged WS's;

adding external names to the name tables of other than said predetermined ones of said workspaces, respectively;

denominating predetermined ones of said names respectively entry and exit points for linking second predetermined ones of workspaces having said designated names and added external names;

while a process is executing in said active workspace encounters an external name in said name table and which is an exit point of such active workspace, exiting the active workspace and continue executing in a one of said packaged WS's having an entry name which is identical to said encountered external name;

when beginning process execution in any predetermined one of said packaged WS's for the first time, copying the name table of the packaged WS into said active workspace and when executing with respect to the packaged WS, accessing objects in the packaged WS from the copy in the predetermined one of said active workspaces rather than the name table of the predetermined one of said packaged WS's;

selecting a one of said packaged WS's to be a future read-only packaged WS; and inserting into said future read-only packaged WS external names that are identical to predetermined designated names in a plurality of said packaged WS's and which have been denominated as entry points and making the given packaged WS a read-only WS;

creating a common area in the internal data storage in which any stored data structure can be accessed by a plurality of programs; and storing a plurality of said packaged WS's in said common area.

4. In the machine-effected method set forth in claim 3, further including the machine-executed steps of:

concatenating access to a plurality of said packaged WS's and for each concatenated packaged WS copying the name table into the active workspace;

invoking operations of the concatenated packaged WS's from others of said concatenated packaged WS's; and invoking operations from said active workspace of each of the packaged WS's from the copied name table from each said packaged WS.

5. In a machine-effected method of executing a program in an interactive environment, including the machine-executed steps of:

in an internal data storage of a host processor simultaneously storing a plurality of interactive workspaces, each workspace having a name table indicating a program to be executed in the respective workspace;

executing a program in a first one of the workspaces from a name table in the first one workspace;

establishing a program sequencing control data structure in the first one workspace which represents a desired sequence of program operation in a second one of the workspaces;

while executing the program in the first one of the workspaces, accessing said second one of the workspaces and executing a program in the second workspace from the program sequencing control data structure in the first one workspace;

establishing said program sequencing control data structure as a copy of a name table in the second workspace;

loading a plurality of additional workspaces into the internal data storage and copying the name table of each of said additional workspaces into said first workspace; and executing the program in the first workspace from said first workspace's name table such that said plurality of copies of name tables in the first workspace effect program execution in said plurality of additional workspaces.

6. In the machine-effected method set forth in claim 5, further including the machine-executed step of making said second one workspace read only.

7. In the machine-effected method set forth in claim 5 further including the machine-executed steps of:

inserting named objects, functions and values in each of the workspaces which are to be operated on during processing in the respective workspaces;

inserting a name table having internal names in each of said workspaces identifying said named objects for controlling processing steps and indicating processing status in the respective workspaces;

inserting an external name in the second one workspace as an entry point for such workspace;

inserting an external name in the first one workspace identifying the external name of the second one workspace for linking said first one and and second one workspaces.

* * * * *